United States Patent
Lindquist (10) Patent No.: US 11,611,571 B2
(45) Date of Patent: Mar. 21, 2023

(54) DETECTING SUSPICIOUS FILE ACTIVITY

(71) Applicant: Code42 Software, Inc., Minneapolis, MN (US)

(72) Inventor: Peter John Lindquist, St. Paul, MN (US)

(73) Assignee: Code42 Software, Inc., Minneapolis, MN (US)

( * ) Notice: Subject to any disclaimer, the term of this patent is extended or adjusted under 35 U.S.C. 154(b) by 678 days.

(21) Appl. No.: 16/558,588

(22) Filed: Sep. 3, 2019

(65) Prior Publication Data
US 2021/0067522 A1    Mar. 4, 2021

(51) Int. Cl.
*H04L 29/06*    (2006.01)
*H04L 9/40*    (2022.01)
*G06N 20/00*    (2019.01)

(52) U.S. Cl.
CPC ........ *H04L 63/1416* (2013.01); *G06N 20/00* (2019.01); *H04L 2463/146* (2013.01)

(58) Field of Classification Search
CPC .......... H04L 63/1416; H04L 2463/146; G06N 20/00
See application file for complete search history.

(56) References Cited

U.S. PATENT DOCUMENTS

| | | | | |
|---|---|---|---|---|
| 8,856,390 B1 * | 10/2014 | Stevens | ................. | G06F 13/426 710/17 |
| 8,984,632 B1 * | 3/2015 | Laffoon | ................... | H04L 67/34 726/22 |
| 10,019,582 B1 * | 7/2018 | Mao | ...................... | H04M 15/47 |
| 10,133,866 B1 * | 11/2018 | Kumar | ................... | G06F 21/565 |
| 10,409,987 B2 * | 9/2019 | Yablokov | ............... | G06F 21/561 |
| 11,012,454 B1 * | 5/2021 | Han | ..................... | H04L 63/1425 |
| 2011/0087495 A1 * | 4/2011 | O'Neill | ................... | G06Q 40/02 705/1.1 |
| 2011/0173699 A1 * | 7/2011 | Figlin | ................. | H04L 63/1408 726/23 |
| 2011/0225650 A1 * | 9/2011 | Margolies | .............. | G06Q 10/06 726/22 |
| 2013/0305357 A1 * | 11/2013 | Ayyagari | .............. | H04L 41/069 726/22 |
| 2015/0172321 A1 * | 6/2015 | Kirti | ................... | H04L 63/1425 726/1 |
| 2017/0063930 A1 * | 3/2017 | Chesla | ................ | H04L 63/1425 |
| 2020/0110870 A1 * | 4/2020 | Girdhar | ................ | G06F 21/316 |

* cited by examiner

*Primary Examiner* — Vance M Little
(74) *Attorney, Agent, or Firm* — Schwegman Lundberg & Woessner, P.A.

(57) ABSTRACT

Systems and techniques for detecting suspicious file activity are described herein. System for identifying anomalous data events is adapted to monitor a networked file system and receive an indication of a suspicious event associated with a user and a file. The system is further adapted to perform a pattern of behavior analysis for the user, perform an adjacency by time analysis based on a set of events before the suspicious event and a set of events after the suspicious event, and perform an adjacency by location analysis using a set of files located in a location of the file. The system is further adapted to determine whether the suspicious event is an anomalous event based on the pattern of behavior analysis, the adjacency by time analysis, and the adjacency by location analysis and display a report for the user including the anomalous event.

17 Claims, 7 Drawing Sheets

Key Events – Before

* /TeamDrive/Customers/sales_figures.xlsx (modified)
* /TeamDrive/Customers/customer_list.xlsx (modified) ← 310
* ~/Downloads/customer_list.xlsx (created) ← 315

Triggering Event

* My Thumb (USB Drive) (inserted) ← 305

Key Events – After

* /My Thumb/customer_list.xlsx (created) ← 320
* My Thumb (USB Drive) (removed)
* ~/Downloads/customer_list.xlsx (deleted) ← 325
* My Thumb (USB Drive) (inserted)
* ~/Documents/temp/customer_list.xlsx (created)

*FIG. 3*

```
- TeamDrive1 (Sales Leadership)/   ← 405

+ Archive/
    - Customers/
        - customer_list.xlsx (4), User A   ← 425
          customer_list.xlsx (3), User A
          customer_list.xlsx (2), User A
          customer_list.xlsx (1), User A
        + sales_figures.xlsx (3), User H
    + Pipeline/

- User B, Mac/   ← 410

+ Documents/
    + Pictures/
    - ~/Downloads/
        - customer_list.xlsx (2) (deleted)   ← 420
          customer_list.xlsx (1) (created)

- User C, Windows/   ← 415

- ~/My Documents/temp/
        + customer_list.xlsx (4)
        + sales_figures.xlsx (2)   ← 430
    - ~/My Pictures/
```

DETECTING SUSPICIOUS FILE ACTIVITY

TECHNICAL FIELD

Embodiments described herein generally relate to identifying suspicious activity in a large interconnected file system and specifically tracing the roots and extent of the suspicious activity.

BACKGROUND

An organization may employ network and data storage systems in a data cloud to enable users to access, store, and work with files and data objects. The data cloud interconnecting users in an organization may process billions of file interactions. Analyzing these file interactions, and their associated artifacts, to identify suspicious behavior or events is a challenging task which requires the use of large amounts of computing resources. This task is made even more difficult by the challenge of determining whether an identified suspicious behavior or event is an actual problem for an organization, and determining the extent of the problem, such as by identifying files and users that are involved, or associated, with the suspicious activity.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An organization's file system or data cloud may process or experience billions of interactions, even within a single day. Thus, investigating and identifying suspicious interactions with a file system or data cloud may be similar to finding a needle in a haystack. An investigation may be triggered when a person, or user, indicates, or acts in a manner that suggests, that they may be inclined to access data that they are not authorized to access, delete data which should not be deleted, or removed data from a system that should not be found outside the system.

In an example, a user who has given notification that they intend to leave an organization might be suspected of misappropriating data, software, or other digital intellectual property or digital assets prior to their official departure. Such misappropriation can include the unauthorized copying, printing, transmitting, or removal of such protected data. Other examples of events which may trigger an investigation include situations where a user which has been accused of insubordination, received a bad review, or engaged in an altercation with a colleague. In another example, social media accounts of users may be monitored it identify other events which may trigger an investigation, such as the publication of disparaging remarks about the organization.

Aspects of the present disclosure are directed to techniques (e.g., systems, methods, and machine-readable storage mediums) for identifying and collecting data on users and file manipulation events related to suspicious activity in a networked file system. Such techniques may include receiving a trigger to begin an investigation and recursively evaluating events to discover the full extent of inappropriate or unauthorized file access and activities.

As an example scenario, a user without a history of using external drives has moved a certain file to a removable storage device, such as a thumb drive or other Universal Serial Bus (USB) storage device. This is potentially an interesting event that may capture the attention of an investigator because the user recently gave notice that they will be leaving the organization. The investigator may be interested in identifying information that is useful for determining whether this event is unusual. Such information can include data that is indicative of a pattern of behavior for the user, adjacent events by time to show what happened before or after the potentially interesting event, and adjacent events by location to show what happened near the potentially interesting event.

An investigator may have to answer a number of questions to determine whether an interesting event constitute, or is evidence of, inappropriate behavior or misappropriation of intellectual property. In an example, in relation to the pattern of behavior of a user, the investigator may have to determine: whether the user has a history of using external drives, the user's history of sharing via email attachments or sync tools, or whether the user usually handle an indicated type of file. In another example, in relation to adjacent events by time, the investigator may have to determine: what how the file was accessed file within a window of time before the interesting event, whether the file was downloaded from another computing system before it was copied to a removable storage device, or whether the file appears on a coworker's machine after the event. In additional example, in relation to adjacent events by location, the investigator may have to determine: which files are in the same filesystem folder as the file that was moved to the removable storage device, or whether any other files or filesystem objects were deleted from that folder within an indicated window of time.

Figure 1:
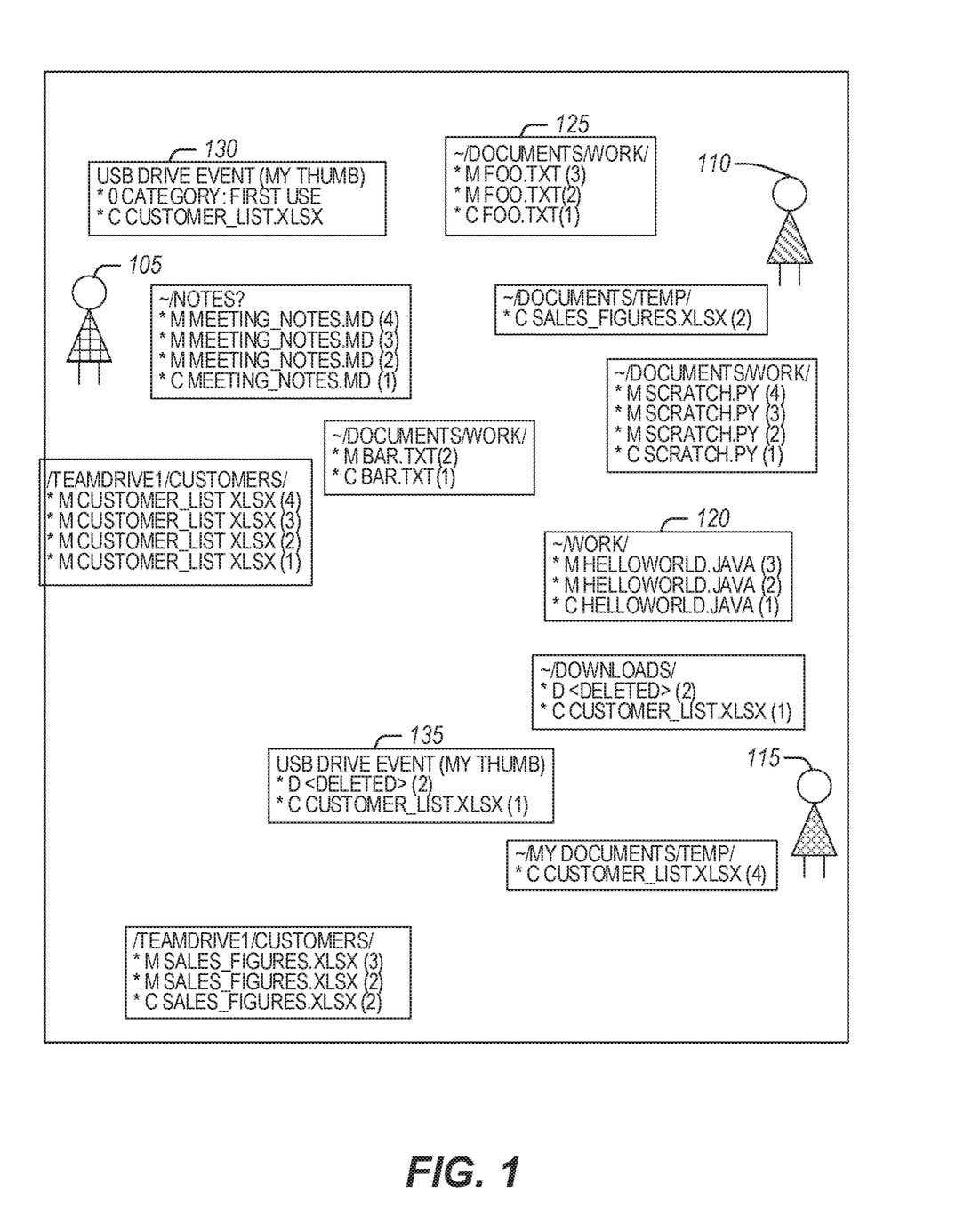
FIG. 1 illustrates an example of a data cloud of file interactions, in accordance with some embodiments.

FIG. 1 illustrates an example of data cloud 100 of file interactions, in accordance with some embodiments. The data cloud 100 includes interactions from users 105, 110, and 115. The data cloud 100 is an example of a representation of the types of file interaction events that may occur in a networked computing file system. These interactions may include the creation and modification of files, such as coding files as shown in interactions 120, and documents as shown in interaction 125.

A file interaction event may be a trigger for an investigation of suspicious behavior. For example, interaction 130 includes saving a list of customers (a sensitive piece of data) to a USB drive. This file interaction event may be identified as a suspicious event as it involves a sensitive or protected set of data, which normally should not be removed from the file system. The file interaction event may be further identified as a suspicious event because the sensitive data is copied to a removable storage device, which may be used for uncontrolled and unauthorized distribution.

Interaction 135 may provide further evidence that the file interaction event depicted in interaction 130 is a suspicious event. More specifically, interaction 135 includes the list of customers being deleted from the USB drive, possibly indicating the user is attempting to cover their tracks.

Events involved in an investigation may be classified as suspicious or anomalous. A suspicious event is an event that prompts, or requires, further investigation to determine whether the suspicious event is an anomalous event. For example, a user copying a file to a USB drive, such as after the user has indicated they will be leaving the organization, is a suspicious event. However, if further investigation indicates that the user simply copied a personal photo from their computer to the USB drive, it may be determined that the suspicious event did not have a malicious intent or inappropriate objective, thus the event may be dismissed. However, if such further investigation indicates that the user copied an archive of the organization's data to the USB drive, it may be determined that the suspicious event is not an innocent act and through the investigation may be determined to be anomalous. An anomalous event may include an event that is indicative of any file or filesystem use or access that is inappropriate for the user, file, or filesystem. For example, copying sensitive data files to a cloud service may be appropriate file manipulation, but copying such files to a personal account of a cloud service may not constitute appropriate file manipulation. Thus, an anomalous event may be, but is not limited to, a suspicious event that is determined to be malicious, inappropriate, unauthorized, or outside of scope access to data. An anomalous even may also include a suspicious event that is determined to constitute a misappropriation of data.

A haystack investigation may proceed in multiple directions. Starting from an initial investigation in to a suspicious event, additional paths of investigation may be discovered though use of the three investigation tools: pattern of behavior, adjacent events by time, and adjacent events by location. The additional paths of investigation may include additional files that were stored, modified, or created which were not accessible by the user, thus resulting in a similar investigation for each of those additional files. The additional paths of investigation may include additional users who provided the user access to the files or who exchanged the files with the user. Pursuing such additional investigation paths may implicate multiple users as being involved in the inappropriate behavior, triggering investigations with each of those users. Accordingly, based on the originally identified event, a web of other events, interactions, and users may be discovered. As each new file or user is discovered, they are added to an overall report for misappropriation of data files based on the suspicious event.

Qualifiers or rules may be used to determine if the interactions and events are determined to be suspicious or interesting for investigation as well as a final determination of misappropriation. The qualifiers and rules may be based on a user's position within the organization, groups they are a part of at the organization, and files or file types they have been granted permission to access. For example, an entry level software engineer copying a file containing a prototype schematic to a USB drive may be a suspicious and inappropriate event. However, the president of the company copying the same prototype schematic to a USB drive may be a suspicious event, but such event may be determined to be appropriate and dismissed as the president is allowed to have access to such files and may be putting the file on the USB drive for a business trip.

A haystack investigation system may receive a trigger or other indication of a user, group of users, or file directories to monitor. The subject or scope of the monitoring may be a user, but may also be a group of users, a directory of files, or a specific device, such as a server. The monitoring may include multiple locations or devices. For example, when monitoring a user, all of the devices of the user may be monitored, such as their laptop, mobile phone, and tablet. The investigation may identify file interactions that are of interest, such as creating a file, modifying, and deleting. The investigation may identify suspicious events, such as the copying of data to a USB drive, the uploading of data to a cloud storage service, the manipulation of large files or archives, and multipurpose internet mail extension (MIME) type mismatches.

The haystack investigation system may use machine learning to identify suspicious events and anomalies in a pattern of behavior analysis. The machine learning model may be a classifier model. The classifier model may be trained with a set of labeled events. For example, the training set may include events which are normal (or non-suspicious), suspicious, and anomalous. As previously described, normal events may include typical file interactions such as creating and modifying files. Suspicious events may include loading a file to a USB drive or uploading to a cloud storage service. Anomalous events may include MIME type mismatches or movement of archive files or secured data.

A machine learning model may be used with the pattern of behavior analysis to identify anomalies in the pattern. This may include providing a history of file interactions (e.g., file interaction events) performed by a user as the training data. A subset of historical interactions (e.g., interactions occurring within an indicated window of time) may then be provided to the trained model to identify actions which are uncommon or anomalous based on the training data.

The pattern of behavior machine learning model may be trained using data collected from a set of related users. For example, the training data may include file interactions from a group of users that are all software engineers. This training data may then train the machine learning model on what constitutes standard actions or behavior (e.g., file access and interactions) of a software engineer. When a user is under investigation, their historical actions may be provided to a model corresponding to the group they are in, such as software engineers, to identify any actions in their history which are outliers for standard actions of that group.

Different models may be trained for different groups as each group may have different actions as part of their standard operations. For example, human resources associates and software engineers may access different types of files. A human resources associate may have access to payroll information, while a software engineer may not have access to such files. Distinctions between groups may also be made based on seniority. For example, file access and interactions may be different from associates to management to executives. In an example, the normal actions of an executive may include file access or interactions that may be suspicious when performed by other types of users. In a particular example, an executive may frequently load data to USB drives for taking to presentations, where an associate may rarely have reason to remove data from the file system by USB drive.

As the haystack investigation system monitors a designated subject area, suspicious activity is detected and investigations are prompted. As discussed, a suspicious activity may be copying files to a USB drive. Other types of suspicious events may include, but is not limited to, downloading a large archive of data, uploading files or archives to a cloud service (especially a cloud service account not associated with the organization), uploading files through a web browser, and detection of a multipurpose internet mail extension (MIME) MIME type mismatch. MIME type is a standard that indicates the nature and format of a document, file, or assortment of bytes. A common occurrence of MIME type mismatch is when a user changes the extension of a file such that the file name appears to indicate it is one type of file, but the file is different than what the extension type indicates. For example, changing the extension on an archive file to indicate it is a text file.

The suspicious event may be identified through the pattern of behavior. A history of actions and events related to the scope of an investigation is gathered and graphed to determine whether the suspicious event fits with a pattern of behavior or whether the suspicious event is an outlier. For example, if the scope of an investigation is a user and the suspicious event is loading files to a USB drive, then the user's history is analyzed to determine if loading files to a USB drive is a common action for this user. An example of this may be seen in FIG. 2. In another example, if the scope of an investigation includes monitoring a directory of archive files, the suspicious event may be uploading an archive to a cloud service. However, the history of the directory may indicate a pattern of behavior that includes uploading the archive to the cloud service every night as part of a backup and thus is not anomalous behavior.

Figure 2:
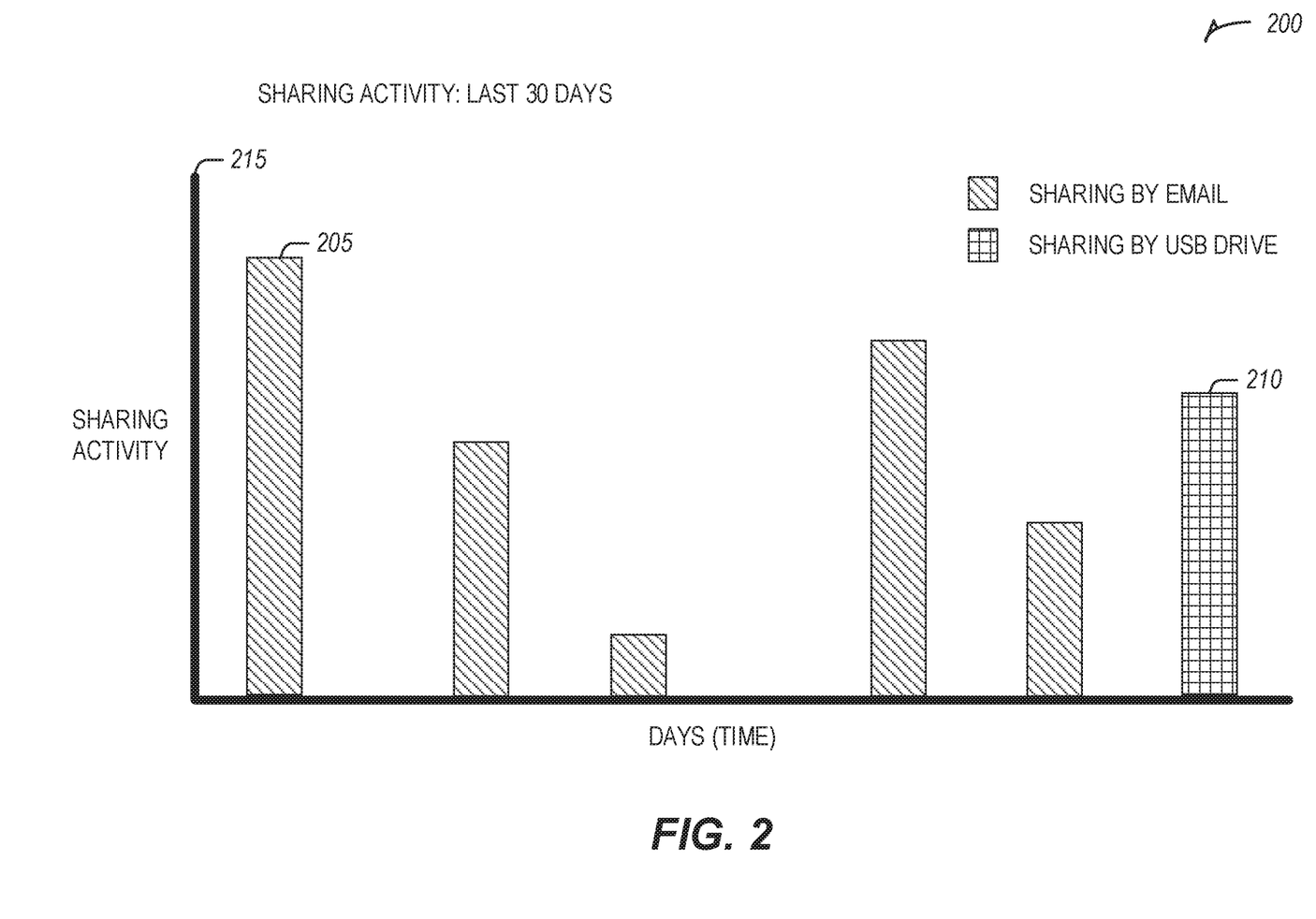
FIG. 2 is an illustration of a user's sharing history, in accordance with some embodiments.

FIG. 2 is an illustration of a user's sharing history 200, in accordance with some embodiments. The graph 215 is a bar graph representing the amount of file sharing performed by the user for the last 30 days according to the user's sharing history. The graph 215 includes sharing by email and sharing by USB drive. In one instance, bar 205 indicates that the user had a day where there was a large amount of file sharing by email. Over the last 30 days, the user shared files by email occasionally, where some days included varying amounts of sharing and some days had no sharing. However, an anomaly in the user's pattern of behavior is detected as on the most recent day, bar 210 indicates the user has had a large amount of file sharing by USB drive. This is uncharacteristic and indicates a suspicious event.

When a suspicious event is identified or confirmed by the haystack investigation system using a pattern of behavior, the suspicious event may be analyzed based on adjacency of time, such as to determine what events happened before and after the suspicious event. In an example, adjacency of time analysis may be used when a file was copied to a USB drive, such as to determine what events preceded that copy event. Such analysis may determine whether the copied file was recently moved to the directory from which it was copied or if the copied file had a long presence in that directory. The adjacency by time analysis may include analyzing events that follow the suspicious event. Continuing the previous example, if the events show more files were moved to the USB drive, then the scope of the investigation may be expanded to include those files as well. If the events show that the file was immediately deleted, this may be used to determine that the suspicious event as an anomalous event as the user may be trying to cover their tracks.

Figure 3:
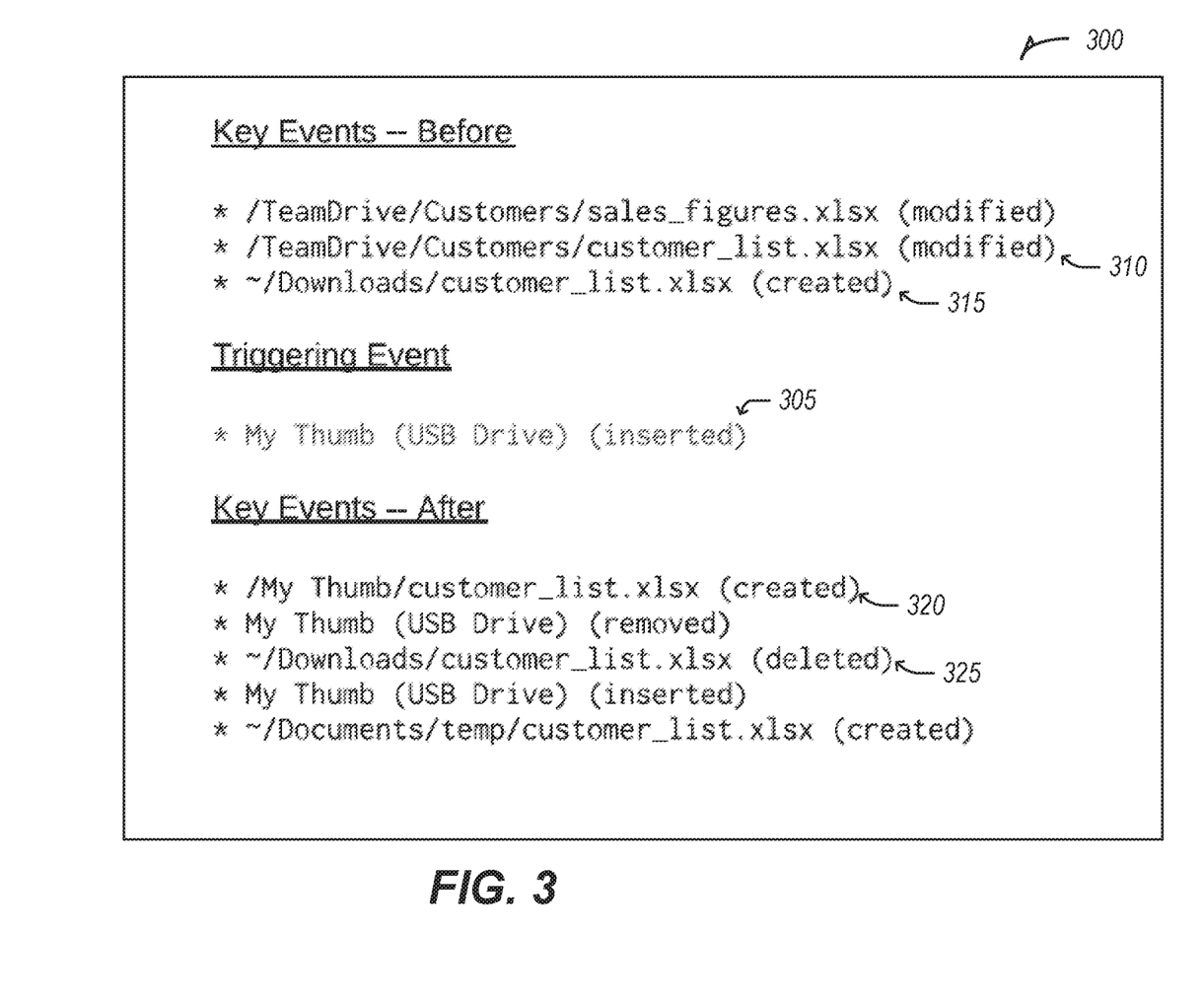
FIG. 3 illustrates an example of events based on adjacency of time, in accordance with some embodiments.

FIG. 3 illustrates an example 300 of events based on adjacency of time, in accordance with some embodiments. The example 300 identifies a triggering event 305 of a USB drive inserted into a user's computer. The adjacency by time analysis then collects notable events which occurred before and after the triggering event 305. Before the triggering event 305, the user accessed the customer list file located on the team drive and modified it at event 310. The user then copied the customer list file to the downloads directory on the user's computer at event 315. After the triggering event 305, the user copied the customer list to the USB drive at event 320 and then deleted the customer list file from the download directory at event 325. An investigation that was initiated by the triggering event 305 and that includes performing an adjacency by time analysis may determine that the user appears to access a sensitive file located on a shared drive, copy the file to the USB drive, and then delete the file from their computer, such as to attempt at erasing the evidence. Analysis of the triggering and suspicious event 305 appears, as shown in the example 300, to indicate the user has performed an anomalous event and is attempting to take sensitive information.

The haystack investigation system may attempt to discover additional information about the file or files involved in the suspicious event. This may include attempting to discover where the file came from and where else it may be located in the organizations file system.

The haystack investigation system may analyze the suspicious event based on adjacency of location. As discussed herein, users may have multiple devices and multiple locations for storing data (e.g., personal cloud storage services). Thus, when a suspicious event is identified, the data surrounding the data of the suspicious event is analyzed. For example, if the event involves copying data from a first directory on a computer to a second directory on a mobile device, then the other files in the first and second directories are analyzed. Additionally, the constructs of the directories may be analyzed, such as being secured by authorization directories or an encrypted directory.

Adjacency by location analysis of a suspicious even associated with a file may include identifying adjacent locations based on the filesystem path or directory of the file, other events that occurred within a window of time of the occurrence of the suspicious event, the type of the file, hashes, and any other similarities that may be found with the file in question. Each adjacent location discovered, such as directories the file has been present in, are added to the investigation. Hashes may be used to identify files in case file names have been changed.

In the analysis of the associated directories, based on the adjacency by location analysis, of the suspicious event, such as the origination and destination directories, the other files in the directories may be investigated. A first step may be to determine if the other files had events similar to the suspicious event, such as being uploaded to a personal cloud service. A full investigation may be performed for the other files, such as performing a pattern of behavior and adjacency by time analysis. Each of the files in the associated directories may be analyzed for MIME type mismatches to determine whether there is an attempt to hide the true nature of the file (e.g., the file is an archive of sensitive data).

Figure 4:
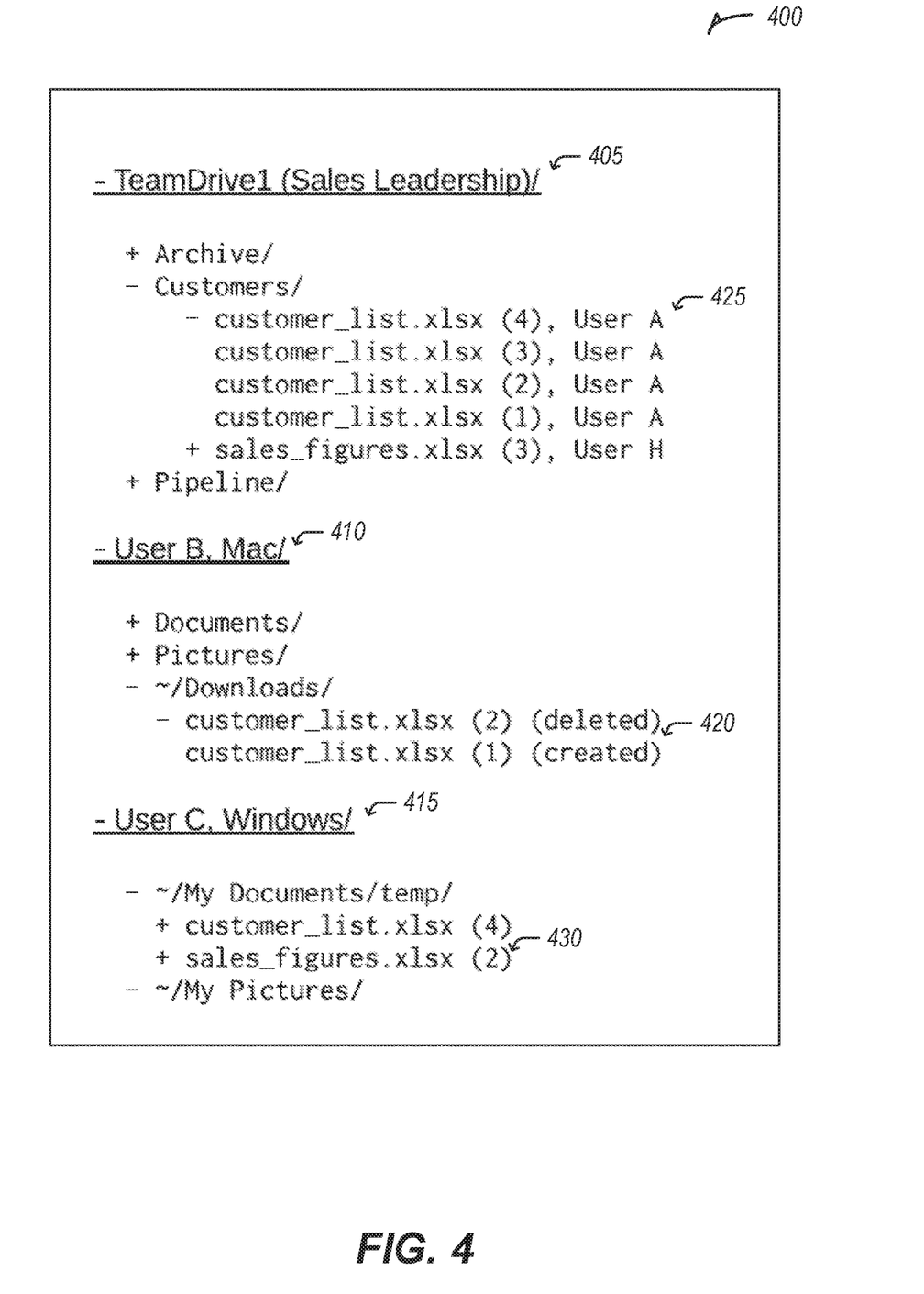
FIG. 4 illustrates an example of adjacency by location analysis, in accordance with some embodiments.

FIG. 4 illustrates an example 400 of adjacency by location analysis, in accordance with some embodiments. The example 400 includes directories where the customer list file has appeared. Such directories include the shared team drive 405, a computer 410 of User B, and a computer 415 of user C. Based on suspicious events 420 of User B, an investigation is being performed. The files 425 in the shared team drive 405 are permitted to be accessed by User A and User H, but not User B or User C. Additionally, the files 425 are not to be moved from the shared team drive 405 without authorization, and thus the reason for investigating suspicious events 420.

When the adjacency by location analysis is performed for the customer list based on the suspicious events 420, the customer list is located on the shared team drive 405 as this is the correct storage location for the customer list. However, it is also discovered to be on the computer 415 of User C. The adjacency by location analysis looks to see what other data may be located in the same location as the investigated file. The adjacency by location analysis discovers that sales figures file 430 is also located in the same directory as the customer list on the computer 415 of User C. The sales figures files 430 is also a file that is not permitted to be on the computer 415 of User C. Thus, the investigation is now expanded, based on the suspicious events 420, to investigate User C and the sales figures file.

Analysis may determine how long the files have been present in the associated directory and what other events have occurred in the directory. The historical timeline may be extended to days or weeks to determine if similar suspicious events have occurred from the directory and the user has spaced out the timing of the events so as to not draw attention. The process may be additive and recursive where for each suspicious event discovered in the directory, the historical timeline is then extended from the point of the new suspicious event and investigated again.

Filters may be applied to limit the data and files which are investigated and analyzed. For example, operating system files, updates, update histories, and browser histories may be filtered from the investigation. Filters may be applied based on file path, time, and file type.

As the investigation proceeds, the haystack investigation system may issue alerts depending on the setting of the system. For a highly sensitive system, an alert may be issued for any suspicious events identified. For a less sensitive system, an alert may be issued once the number of suspicious events exceed a threshold, such as surpassing five unique suspicious events. The same may type of threshold alert may be applied for identifying the suspicious event an anomalous event. When the number of identified anomalous events exceeds a threshold, an alert may be issued.

As the investigation proceeds, each identified suspicious event, anomalous event, associated file, and associated user is added to a report. At the end of the investigation, a report may be generated using the collected data. The information contained in the report may identify the instances of inappropriate or malicious behavior and all users involved.

The haystack investigation system may be connected to other systems within the organization. For example, the haystack investigation system may receive alerts or prompts from the human resources computing system. Each time the human resources system receives input that a user (e.g., employee) has quit, is going to quit, has been terminated, been given a bad review, or has been involved in an altercation, then the human resources system may send a prompt to the haystack investigation system to begin monitoring the associated user. An overall file system monitor may be used to monitor network traffic and file changes to prompt investigations. For example, monitoring for data uploads through a web browser (such as to a personal cloud storage service or file sharing service) or scanning files for MIME type mismatches may prompt the haystack investigation system to begin an investigation for the associated user or file directory.

Figure 5:
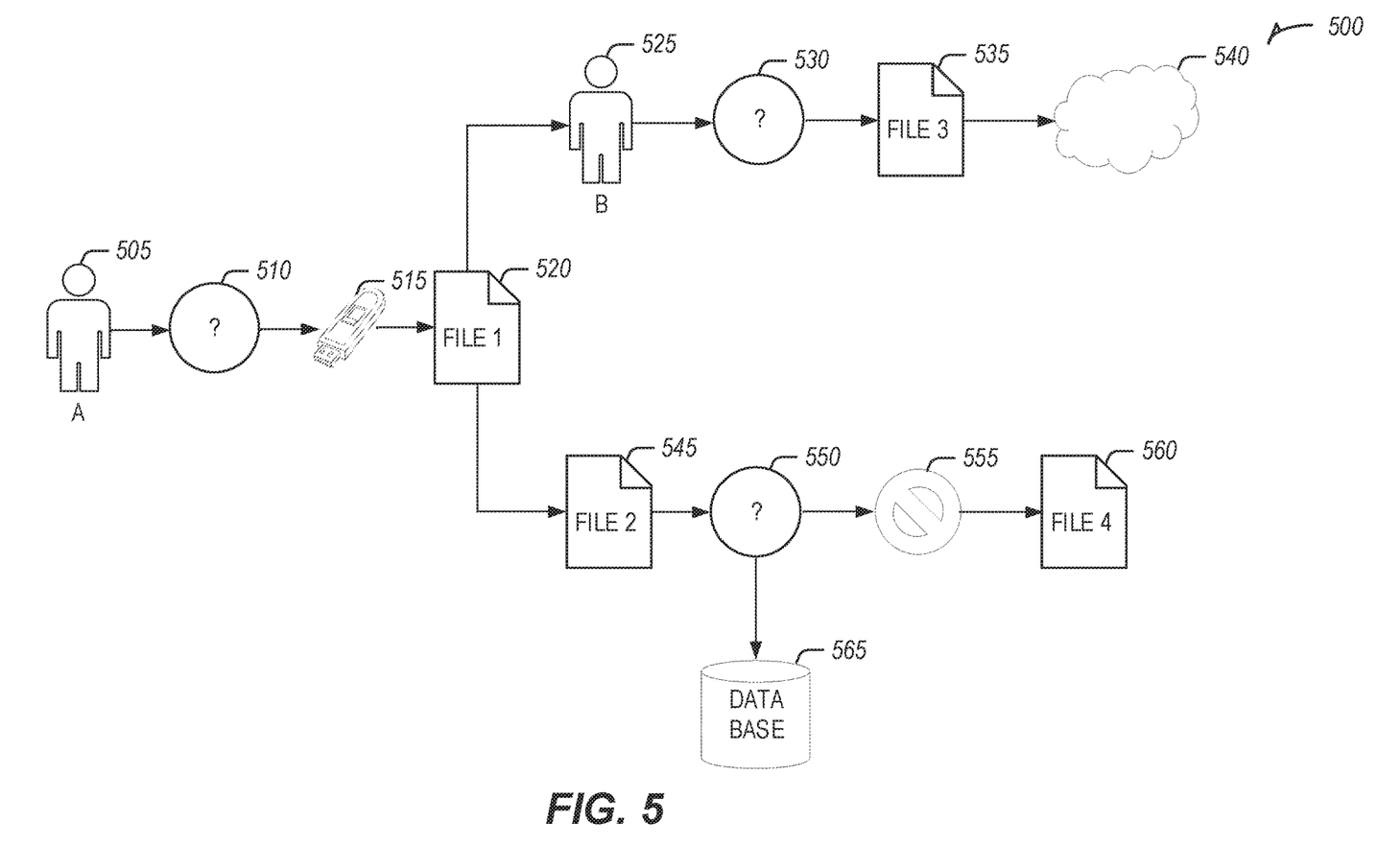
FIG. 5 illustrates an example investigation, in accordance with some embodiments.

FIG. 5 illustrates an example investigation 500, in accordance with some embodiments. The example investigation 500 includes some notable events which occur in an investigation by the haystack investigation system but is not comprehensive of all possible events in an investigation. In the example investigation 500, the haystack investigation system receives a prompt for User A 505 and begins investigation 510. The investigation 510 may monitor User A 505 for suspicious events, such as inserting a USB drive 515. The investigation 510 may perform a pattern of behavior analysis, such as though using a machine learning model to identify if sharing files by USB drive 515 is uncharacteristic for User A 505 or for users in the same group as User A 505. Copying File 1 520 to the USB drive 515 may be elevated to an anomalous event and added to a report for the investigation of User A 505.

The investigation 510 identifies that File 1 520 was copied to the USB drive 515. This prompts investigation 510 to perform an adjacency by time analysis, which may identify that File 1 520 was received from User B 525. Based on identifying that another user may have been involved with the suspicious event of copying File 1 520 to the USB drive 515, a new investigation 530 is begun for User B 525. The investigation 530 may have the haystack investigation system perform the pattern of behavior analysis, the adjacency by time analysis, and the adjacency by location analysis. For example, the pattern of behavior analysis may identify that User B 525 uploaded File 3 535 to a cloud storage service 540. The investigation 530 has identified a suspicious event in the file upload and is added to the report for User A 505 and User B 525.

As seen in FIG. 2, the pattern of behavior analysis may identify multiple files copied to a USB drive on the same day. The investigation 510 may perform a pattern of behavior analysis to identify that copying file 1 520 to USB drive is an anomaly. This may prompt the investigation 510 to perform an adjacency by time analysis and discover that after File 1 520 was copied to the USB drive 515, File 2 545 was also copied to USB drive 515. Thus File 2 545 is added to the investigative report for investigation 510 and User 505.

The identification of File 2 545 may prompt a new investigation 550. The haystack investigation system may attempt to locate other instances of File 2 545. It may find one instance of File 2 545 in the shared database 565, the approved storage location for File 2 545. This leg of investigation 550 may end at this point. However, investigation 550 may discover, such as through an adjacency by location analysis, that there is a MIME type mismatch 555 which is then identified as File 4 560. A MIME type mismatch 555 is an anomalous event and is added to the report for investigation 510 and User 505.

Figure 6:
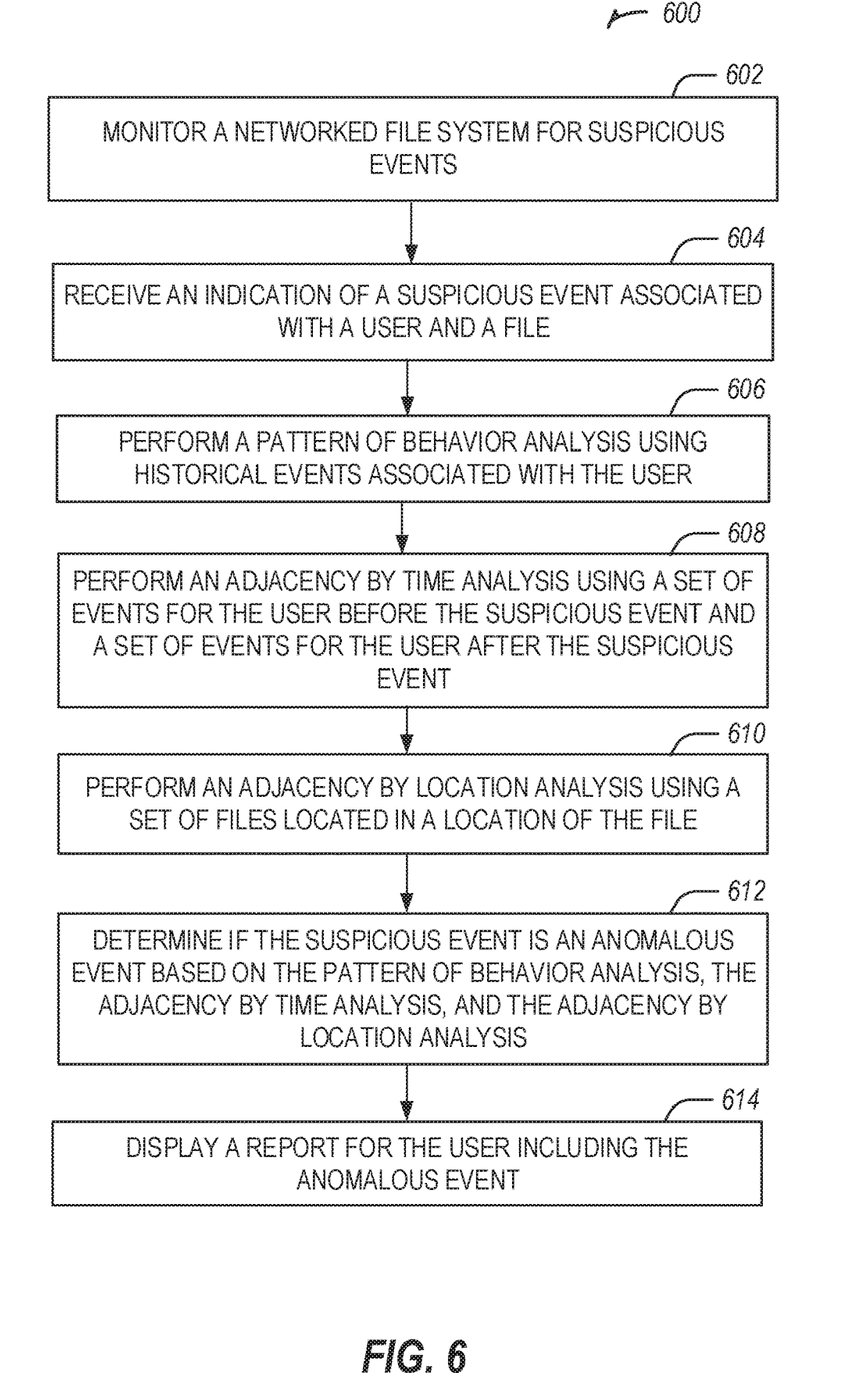
FIG. 6 illustrates a flowchart showing a technique for a haystack investigation, in accordance with some embodiments.

FIG. 6 illustrates a flowchart showing a technique 600 for a haystack investigation, in accordance with some embodiments. The technique 600 includes an operation 602 to monitor a networked file system for suspicious events. The networked file system may be multiple computing devices, such as personal computers, tablets, mobile phones, servers, and databases. These devices may be connected through a network. The networked file system may connect to the internet.

The technique 600 includes an operation 604 to receive an indication of a suspicious event associated with a user and a file. The suspicious event may be one of inserting a Universal Serial Bus (USB) storage device, uploading a file to a cloud storage service, and identifying a multipurpose internet mail extension (MIME) type mismatch.

The technique 600 includes an operation 606 to perform a pattern of behavior analysis using historical events associated with the user. The events may include creating, deleting, modifying, and copying a file. The pattern of behavior analysis may further include operations to train a machine-learning model for the pattern of behavior analysis using historical event data associated with the user to identify a variance in events associated with the user. The pattern of behavior analysis may further include operations to train a machine-learning model for the pattern of behavior analysis using historical event data associated with users in a similar group as the user to identify a variance in events associated with the user.

The technique 600 includes an operation 608 to perform an adjacency by time analysis using a set of events for the user before the suspicious event and a set of events for the user after the suspicious event. The adjacency by time analysis analyzes the events before and after the suspicious event to identify evidence for the suspicious event being an anomalous event. The adjacency by time analysis analyzes the events before and after the suspicious event to identify the origin of the suspicious event, including other users that may be linked to the suspicious event.

The technique 600 includes an operation 610 to perform an adjacency by location analysis using a set of files located in a location of the file. The adjacency by location analysis may evaluate if there are any other files present in the same location as the file in question. Users have a tendency to do the same things. Thus, if a user was attempting to steal sensitive data, they may have placed the file in their "downloads" directory. It is likely, if the user is attempting to steal data from more than one file, then they placed the other files in the same "downloads" directory.

The technique 600 includes an operation 612 to determine if the suspicious event is an anomalous event based on the pattern of behavior analysis, the adjacency by time analysis, and the adjacency by location analysis. The three analysis steps combined may indicate if the suspicious event was actually malicious and should be classified as anomalous. The technique 600 includes an operation 614 display a report for the user including the anomalous event. The report may include information about the user and the devices associated with the user. The report may include the anomalous event with additional suspicious events and anomalous events associated with the user. The report may include information about the file or files associated with the anomalous events.

The technique 600 may further include operations to identify, through the adjacency by time analysis, a second user associated with the file. The technique 600 may further include operations to perform a second pattern of behavior analysis using historical events associated with the second user, perform a second adjacency by time analysis using a set of events for the second user before the suspicious event and a set of events for the second user after the suspicious event, and perform a second adjacency by location analysis using a set of files located in a location, associated with the second user, of the file. The technique 600 may further include operations to determine if the suspicious event is an anomalous event based on the second pattern of behavior analysis, the second adjacency by time analysis, and the second adjacency by location analysis and display a report for the user and the second user including the anomalous event.

The technique 600 may further include operations to identify, through the adjacency by location analysis, a second file and identify a second suspicious event for the second file and associated with the user. The technique 600 may further include operations to perform a second pattern of behavior analysis in relation to the second suspicious event using historical events associated with the user, perform a second adjacency by time analysis using a set of events for the user before the second suspicious event and a set of events for the user after the second suspicious event, and performing a second adjacency by location analysis using a set of files located in a location of the second file. The technique 600 may further include operations to determine if the second suspicious event is a second anomalous event based on the second pattern of behavior analysis, the second adjacency by time analysis, and the second adjacency by location analysis and display a report for the user including the second anomalous event.

Figure 7:
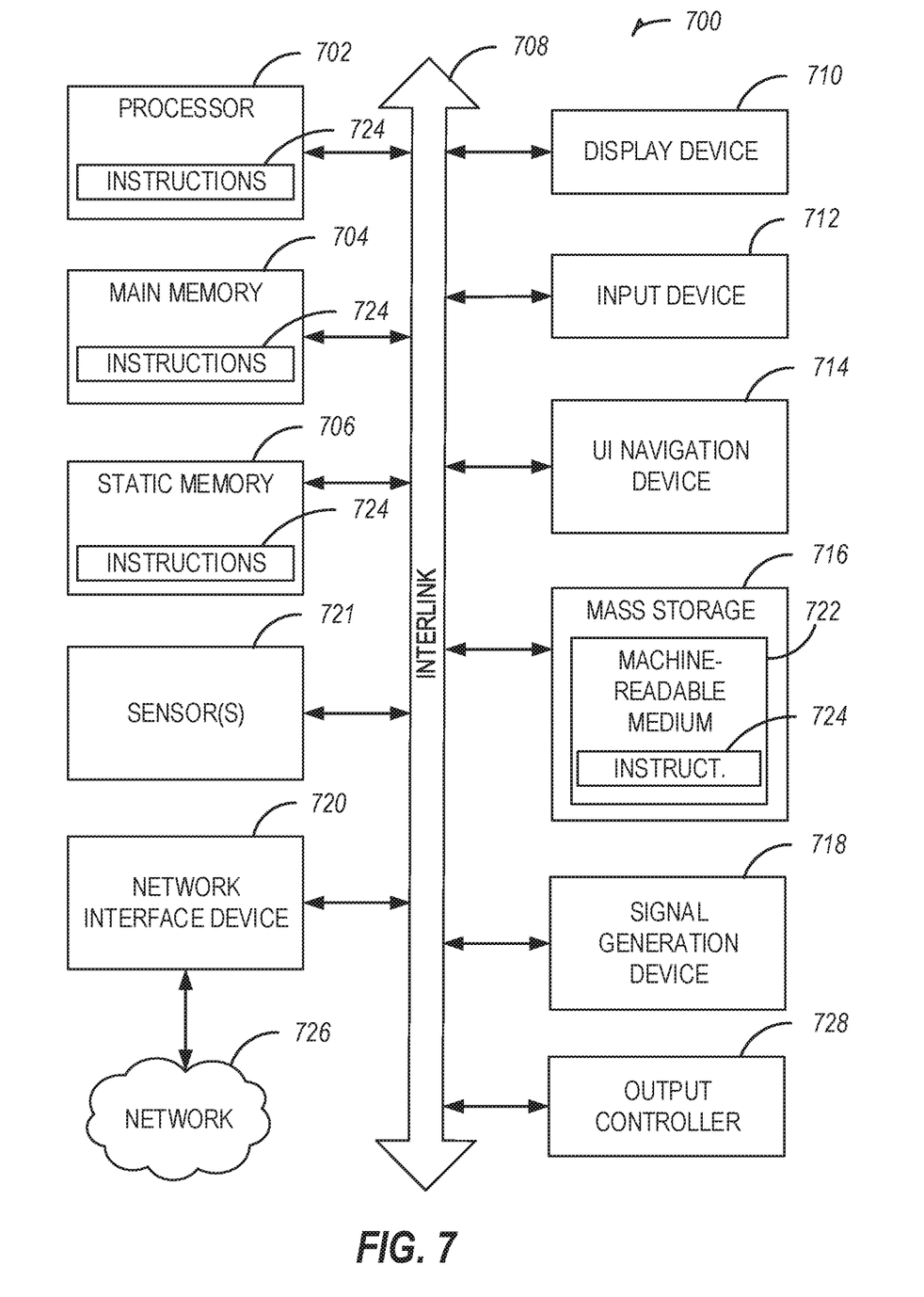
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Example 1 is a method for identifying anomalous data events, comprising: monitoring a networked file system for suspicious events; receiving an indication of a suspicious event associated with a user and a file; performing a pattern of behavior analysis using historical events associated with the user; performing an adjacency by time analysis using a set of events for the user before the suspicious event and a set of events for the user after the suspicious event; performing an adjacency by location analysis using a set of files located in a location of the file; determining whether the suspicious event is an anomalous event based on the pattern of behavior analysis, the adjacency by time analysis, and the adjacency by location analysis; and displaying a report for the user including the anomalous event.

In Example 2, the subject matter of Example 1 includes, wherein events include creating, deleting, modifying, and copying a file.

In Example 3, the subject matter of Examples 1-2 includes, wherein suspicious event includes inserting a Universal Serial Bus (USB) storage device in to a computing system, uploading a file to a cloud storage service, and identifying a multipurpose internet mail extension (MIME) type mismatch.

In Example 4, the subject matter of Examples 1-3 includes, training a machine-learning model for the pattern of behavior analysis using historical event data associated with the user to identify a variance in events associated with the user.

In Example 5, the subject matter of Examples 1-4 includes, training a machine-learning model for the pattern of behavior analysis using historical event data associated with users in a similar group as the user to identify a variance in events associated with the user.

In Example 6, the subject matter of Examples 1-5 includes, identifying, through the adjacency by time analysis, a second user associated with the file; performing a second pattern of behavior analysis using historical events associated with the second user; performing a second adjacency by time analysis using a set of events for the second user before the suspicious event and a set of events for the second user after the suspicious event; performing a second adjacency by location analysis using a set of files located in a location, associated with the second user, of the file; determining if the suspicious event is an anomalous event based on the second pattern of behavior analysis, the second adjacency by time analysis, and the second adjacency by location analysis; and displaying a report for the user and the second user including the anomalous event.

In Example 7, the subject matter of Examples 1-6 includes, identifying, through the adjacency by location analysis, a second file; identifying a second suspicious event for the second file and associated with the user; performing a second pattern of behavior analysis in relation to the second suspicious event using historical events associated with the user; performing a second adjacency by time analysis using a set of events for the user before the second suspicious event and a set of events for the user after the second suspicious event; performing a second adjacency by location analysis using a set of files located in a location of the second file; determining if the second suspicious event is a second anomalous event based on the second pattern of behavior analysis, the second adjacency by time analysis, and the second adjacency by location analysis; and displaying a report for the user including the second anomalous event.

Example 8 is a system for identifying anomalous data events, comprising: at least one processor; and memory including instructions that, when executed by the at least one processor, cause the at least one processor to: monitor a networked file system for suspicious events; receive an indication of a suspicious event associated with a user and a file; perform a pattern of behavior analysis using historical events associated with the user; perform an adjacency by time analysis using a set of events for the user before the suspicious event and a set of events for the user after the suspicious event; perform an adjacency by location analysis using a set of files located in a location of the file; determine whether the suspicious event is an anomalous event based on the pattern of behavior analysis, the adjacency by time analysis, and the adjacency by location analysis; and display a report for the user including the anomalous event.

In Example 9, the subject matter of Example 8 includes, wherein events include creating, deleting, modifying, and copying a file.

In Example 10, the subject matter of Examples 8-9 includes, wherein suspicious event includes inserting a Universal Serial Bus (USB) storage device in to a computing system, uploading a file to a cloud storage service, and identifying a multipurpose internet mail extension (MIME) type mismatch.

In Example 11, the subject matter of Examples 8-10 includes, instructions to: train a machine-learning model for the pattern of behavior analysis using historical event data associated with the user to identify a variance in events associated with the user.

In Example 12, the subject matter of Examples 8-11 includes, instructions to: train a machine-learning model for the pattern of behavior analysis using historical event data associated with users in a similar group as the user to identify a variance in events associated with the user.

In Example 13, the subject matter of Examples 8-12 includes, instructions to: identify, through the adjacency by time analysis, a second user associated with the file; perform a second pattern of behavior analysis using historical events associated with the second user; perform a second adjacency by time analysis using a set of events for the second user before the suspicious event and a set of events for the second user after the suspicious event; perform a second adjacency by location analysis using a set of files located in a location, associated with the second user, of the file; determine if the suspicious event is an anomalous event based on the second pattern of behavior analysis, the second adjacency by time analysis, and the second adjacency by location analysis; and display a report for the user and the second user including the anomalous event.

In Example 14, the subject matter of Examples 8-13 includes, instructions to: identify, through the adjacency by location analysis, a second file; identify a second suspicious event for the second file and associated with the user; perform a second pattern of behavior analysis in relation to the second suspicious event using historical events associated with the user; perform a second adjacency by time analysis using a set of events for the user before the second suspicious event and a set of events for the user after the second suspicious event; perform a second adjacency by location analysis using a set of files located in a location of the second file; determine if the second suspicious event is a second anomalous event based on the second pattern of behavior analysis, the second adjacency by time analysis, and the second adjacency by location analysis; and display a report for the user including the second anomalous event.

Example 15 is at least one computer readable medium including instructions for identifying anomalous data events that when executed by at least one processor, cause the at least one processor to: monitor a networked file system for suspicious events; receive an indication of a suspicious event associated with a user and a file; perform a pattern of behavior analysis using historical events associated with the user; perform an adjacency by time analysis using a set of events for the user before the suspicious event and a set of events for the user after the suspicious event; perform an adjacency by location analysis using a set of files located in a location of the file; determine whether the suspicious event is an anomalous event based on the pattern of behavior analysis, the adjacency by time analysis, and the adjacency by location analysis; and display a report for the user including the anomalous event.

In Example 16, the subject matter of Example 15 includes, wherein events include creating, deleting, modifying, and copying a file.

In Example 17, the subject matter of Examples 15-16 includes, wherein suspicious event includes inserting a Universal Serial Bus (USB) storage device in to a computing system, uploading a file to a cloud storage service, and identifying a multipurpose internet mail extension (MIME) type mismatch.

In Example 18, the subject matter of Examples 15-17 includes, wherein the instructions further cause the at least one processor to: train a machine-learning model for the pattern of behavior analysis using historical event data associated with the user to identify a variance in events associated with the user.

In Example 19, the subject matter of Examples 15-18 includes, wherein the instructions further cause the at least one processor to: train a machine-learning model for the pattern of behavior analysis using historical event data associated with users in a similar group as the user to identify a variance in events associated with the user.

In Example 20, the subject matter of Examples 15-19 includes, wherein the instructions further cause the at least one processor to: identify, through the adjacency by time analysis, a second user associated with the file; perform a second pattern of behavior analysis using historical events associated with the second user; perform a second adjacency by time analysis using a set of events for the second user before the suspicious event and a set of events for the second user after the suspicious event; perform a second adjacency by location analysis using a set of files located in a location, associated with the second user, of the file; determine if the suspicious event is an anomalous event based on the second pattern of behavior analysis, the second adjacency by time analysis, and the second adjacency by location analysis; and display a report for the user and the second user including the anomalous event.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for identifying anomalous data events, comprising:
   monitoring a networked file system for suspicious events;
   receiving an indication of a suspicious event associated with a user and a file;
   performing a pattern of behavior analysis using historical events associated with the user;
   performing an adjacency by time analysis using a set of events for the user before the suspicious event and a set of events for the user after the suspicious event;
   performing an adjacency by storage location analysis using a set of files located in a storage location of the file;
   determining whether the suspicious event is an anomalous event based on the pattern of behavior analysis, the adjacency by time analysis, and the adjacency by storage location analysis;
   displaying a report for the user including the anomalous event;
   identifying, through the adjacency by time analysis, a second user associated with the file;
   performing a second pattern of behavior analysis using historical events associated with the second user;
   performing a second adjacency by time analysis using a set of events for the second user before the suspicious event and a set of events for the second user after the suspicious event;
   performing a second adjacency by storage location analysis using a set of files located in a storage location, associated with the second user, of the file;
   determining if the suspicious event is a second anomalous event based on the second pattern of behavior analysis, the second adjacency by time analysis, and the second adjacency by storage location analysis; and
   displaying a second report for the user and the second user including the second anomalous event.

2. The method of claim 1, wherein events include creating, deleting, modifying, and copying a file.

3. The method of claim 1, wherein suspicious event includes inserting a Universal Serial Bus (USB) storage device into a computing system, uploading a file to a cloud storage service, and identifying a multipurpose internet mail extension (MIME) type mismatch.

4. The method of claim 1, further comprising:
   training a machine-learning model for the pattern of behavior analysis using historical event data associated with the user to identify a variance in events associated with the user.

5. The method of claim 1, further comprising:
   training a machine-learning model for the pattern of behavior analysis using historical event data associated with users in a similar group as the user to identify a variance in events associated with the user.

6. The method of claim 1, further comprising:
   identifying, through the adjacency by storage location analysis, a second file;

identifying a second suspicious event for the second file and associated with the user;

performing a second pattern of behavior analysis in relation to the second suspicious event using historical events associated with the user;

performing a second adjacency by time analysis using a set of events for the user before the second suspicious event and a set of events for the user after the second suspicious event;

performing a second adjacency by storage location analysis using a set of files located in a storage location of the second file;

determining if the second suspicious event is a second anomalous event based on the second pattern of behavior analysis, the second adjacency by time analysis, and the second adjacency by storage location analysis; and displaying a report for the user including the second anomalous event.

7. A system for identifying anomalous data events, comprising:

at least one processor; and memory including instructions that, when executed by the at least one processor, cause the at least one processor to:

monitor a networked file system for suspicious events;

receive an indication of a suspicious event associated with a user and a file;

perform a pattern of behavior analysis using historical events associated with the user;

perform an adjacency by time analysis using a set of events for the user before the suspicious event and a set of events for the user after the suspicious event;

perform an adjacency by storage location analysis using a set of files located in a storage location of the file;

determine whether the suspicious event is an anomalous event based on the pattern of behavior analysis, the adjacency by time analysis, and the adjacency by storage location analysis;

display a report for the user including the anomalous event;

identify, through the adjacency by time analysis, a second user associated with the file;

perform a second pattern of behavior analysis using historical events associated with the second user;

perform a second adjacency by time analysis using a set of events for the second user before the suspicious event and a set of events for the second user after the suspicious event;

perform a second adjacency by storage location analysis using a set of files located in a storage location, associated with the second user, of the file;

determine if the suspicious event is a second anomalous event based on the second pattern of behavior analysis, the second adjacency by time analysis, and the second adjacency by storage location analysis; and display a second report for the user and the second user including the second anomalous event.

8. The system of claim 7, wherein events include creating, deleting, modifying, and copying a file.

9. The system of claim 7, wherein suspicious event includes inserting a Universal Serial Bus (USB) storage device into a computing system, uploading a file to a cloud storage service, and identifying a multipurpose internet mail extension (MIME) type mismatch.

10. The system of claim 7, further comprising instructions to:

train a machine-learning model for the pattern of behavior analysis using historical event data associated with the user to identify a variance in events associated with the user.

11. The system of claim 7, further comprising instructions to:

train a machine-learning model for the pattern of behavior analysis using historical event data associated with users in a similar group as the user to identify a variance in events associated with the user.

12. The system of claim 7, further comprising instructions to:

identify, through the adjacency by storage location analysis, a second file;

identify a second suspicious event for the second file and associated with the user;

perform a second pattern of behavior analysis in relation to the second suspicious event using historical events associated with the user;

perform a second adjacency by time analysis using a set of events for the user before the second suspicious event and a set of events for the user after the second suspicious event;

perform a second adjacency by storage location analysis using a set of files located in a storage location of the second file;

determine if the second suspicious event is a second anomalous event based on the second pattern of behavior analysis, the second adjacency by time analysis, and the second adjacency by storage location analysis; and display a report for the user including the second anomalous event.

13. At least one computer readable medium including instructions for identifying anomalous data events that when executed by at least one processor, cause the at least one processor to:

monitor a networked file system for suspicious events;

receive an indication of a suspicious event associated with a user and a file;

perform a pattern of behavior analysis using historical events associated with the user;

perform an adjacency by time analysis using a set of events for the user before the suspicious event and a set of events for the user after the suspicious event;

perform an adjacency by storage location analysis using a set of files located in a storage location of the file;

determine whether the suspicious event is an anomalous event based on the pattern of behavior analysis, the adjacency by time analysis, and the adjacency by storage location analysis;

display a report for the user including the anomalous event;

identify, through the adjacency by time analysis, a second user associated with the file;

perform a second pattern of behavior analysis using historical events associated with the second user;

perform a second adjacency by time analysis using a set of events for the second user before the suspicious event and a set of events for the second user after the suspicious event;

perform a second adjacency by storage location analysis using a set of files located in a storage location, associated with the second user, of the file;

determine if the suspicious event is a second anomalous event based on the second pattern of behavior analysis, the second adjacency by time analysis, and the second adjacency by storage location analysis; and display a second report for the user and the second user including the second anomalous event.

14. The at least one computer readable medium of claim 13, wherein events include creating, deleting, modifying, and copying a file.

15. The at least one computer readable medium of claim 13, wherein suspicious event includes inserting a Universal Serial Bus (USB) storage device into a computing system, uploading a file to a cloud storage service, and identifying a multipurpose internet mail extension (MIME) type mismatch.

16. The at least one computer readable medium of claim 13, wherein the instructions further cause the at least one processor to:
   train a machine-learning model for the pattern of behavior analysis using historical event data associated with the user to identify a variance in events associated with the user.

17. The at least one computer readable medium of claim 13, wherein the instructions further cause the at least one processor to:
   train a machine-learning model for the pattern of behavior analysis using historical event data associated with users in a similar group as the user to identify a variance in events associated with the user.

* * * * *